W. H. FAHRNEY.
VEHICLE WHEEL.
APPLICATION FILED OCT. 5, 1910.
983,612.
Patented Feb. 7, 1911.
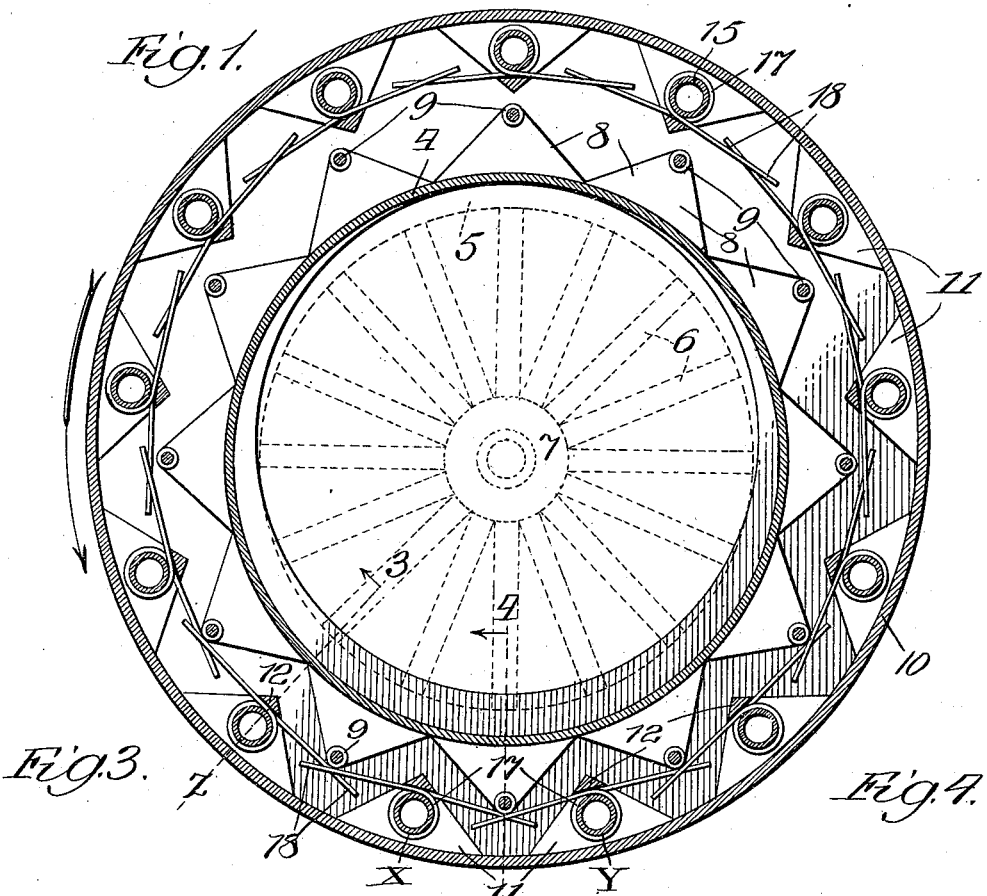
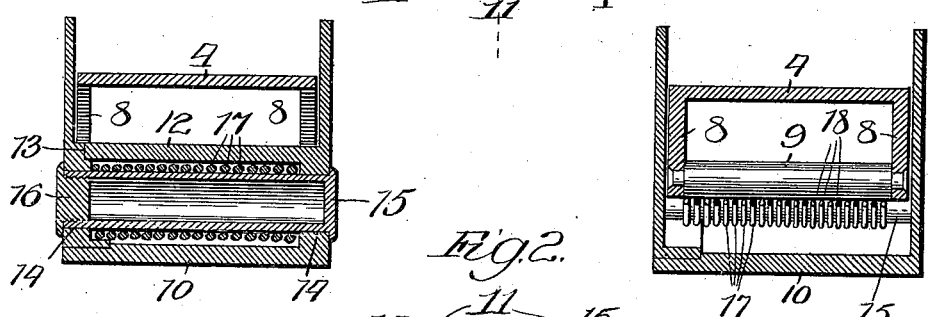
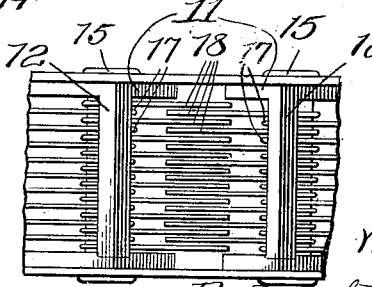

UNITED STATES PATENT OFFICE.

WILLIAM H. FAHRNEY, OF CHICAGO, ILLINOIS.

VEHICLE-WHEEL.

983,612.

Specification of Letters Patent.

Patented Feb. 7, 1911.

Application filed October 5, 1910. Serial No. 585,396.

*To all whom it may concern:*

Be it known that I, WILLIAM H. FAHRNEY, a citizen of the United States, residing at Chicago, in the county of Cook and State of Illinois, have invented a new and useful Improvement in Vehicle-Wheels, of which the following is a specification.

My invention relates to an improvement in the class of vehicle-wheels in which the annular tire-portion is supported on the wheel-center through the medium of interposed springs engaged by relatively-opposing projections alternating with each other on the center and tire to cause the springs to resiliently cushion the load by engagement with the springs of the projections at that part of the tread which is in contact with the road-bed.

In the accompanying drawing, Figure 1 shows my improved wheel by a side view in sectional elevation; Fig. 2 is a plan view of a broken portion of the wheel-tread illustrating the preferred manner of providing the cushioning springs; Fig. 3 is an enlarged section on line 3, Fig. 1, and Fig. 4 is an enlarged section on line 4, Fig. 1.

The wheel-center consists of an annular steel band 4, or rim, on the felly 5 carried by spokes 6 radiating from a hub 7, as shown by the dotted representation in Fig. 1. On opposite edges of the rim are formed teeth 8, shown in their preferred triangular shape presenting a continuous series about each edge of the rim, with coincident members on the opposite rim-edges, forming pairs, connected at their apexes by friction-rollers 9, journaled therein, each pair of the teeth and their connecting rollers thus forming an operating projection.

The tire 10 is an annular steel band of general U-shape in cross-section having its outer wall formed separately to be secured in place as hereinafter described, with the side walls of the tire lapping the edges of the rim. The operating projections within the tire are shown to consist, each, of triangular tooth-like side-members 11 spaced apart at uniform intervals and formed on the opposite tire-walls, with a bar 12 of triangular cross-section, forming the apex of the projection, integral with and extending from each member 11 on the permanent wall to the member coincident therewith on the opposite, separate wall, to meet the last-named member at a recess 13 therein. Through coincident holes 14 provided in the opposite tire-walls at the members 11, headed studs 15, which are preferably tubular, as shown, extend transversely of the tire and are fastened, as by screw-plugs 16, to rigidly secure the separate wall in place. Each stud has coiled about it in successively reverse direction a series of bands 17 of spring metal to cause spring-arms 18 to extend in opposite directions from the ends of each coil and overlap each other between the studs 15, as represented, to be engaged by the rollers 9, forming the apexes of the projections on the rim, adjacent to the tread-portion of the tire.

The projections about the tire necessarily exceed in number those on the rim, on which twelve are shown, while the number on the tire is thirteen, though the excess may be greater, depending on the relative diameters of the rim and tire; but the relation shown will suffice by way of example. Thus, in each complete revolution of the wheel-center, the tire makes twelve-thirteenths of the revolution, and the arrangement in the construction effects compensation in the relative change in radius between them. With the wheel rotating in the direction indicated by the arrow in Fig. 1, the lowermost rim-projection there presented engages the crotch presented by the spring arms 18 at their points of crossing each other, between a certain pair (denoted X Y in Fig. 1), then lowermost, of the projections on the tire; in the next complete revolution of the wheel-center that same projection thereon will similarly engage the crotch of the mutually-crossing arms 18 between the tire-projections denoted X Z, and so on until the wheel-center has made thirteen revolutions, when the relation of parts will be again that presented.

The bearing of the rim-projections adjacent to the tread-portion of the rim there adjacent to the springs causes the latter to carry the load on the wheel in a resiliently-cushioning manner to take up all shock and render the wheel easy-riding like a pneumatically-tired wheel, without the objections to the pneumatic tire of expense, and its tendencies to wear, blow out and puncturing.

What I claim as new and desire to secure by Letters Patent is:

1. In an elastic vehicle-wheel, the combination with the wheel-center, of a rim provided with a circumferential series of radial projections, an annular tire surrounding but spaced from the rim and provided with a circumferential series of inwardly-extending projections exceeding in number those on the rim, and load-carrying springs interposed between said series of projections in the space between said rim and tire and disconnected from said rim-projections, for the purpose set forth.

2. In an elastic vehicle-wheel, the combination with a wheel-center, of a rim provided with a circumferential series of radial projections, an annular tire surrounding but spaced from the rim and provided with side-walls lapping the rim-edges, a series of inwardly-extending projections about the tire exceeding in number those on the rim, and coiled springs on the tire-projections presenting oppositely-extending spring-arms lapping one another between said tire-projections and opposed to but disconnected from the rim-projections, for the purpose set forth.

3. In an elastic vehicle-wheel, the combination with a wheel-center, of a rim provided with a circumferential series of projections having rollers in their bearing-ends, an annular tire surrounding but spaced from the rim and provided with a circumferential series of inwardly-extending projections exceeding in number those on the rim and having transverse studs, and a set of coiled springs on each stud presenting oppositely-extending spring-arms lapping one another between the studs and opposed to but disconnected from the rim-projections, for the purpose set forth.

4. In an elastic vehicle-wheel, the combination with a wheel-center, of a rim provided with a circumferential series of projections, an annular tire surrounding but spaced from the rim and provided with a circumferential series of inwardly-extending projections exceeding in number those on the rim and having transverse studs, and a set of springs oppositely coiled successively about each stud, each spring presenting oppositely-extending arms with the arms of each set lapping those of adjacent sets and opposed to but disconnected from the rim-projections, for the purpose set forth.

5. An elastic vehicle-wheel comprising, in combination, a wheel-center provided with a band-rim having a circumferential series of teeth formed about each edge-portion with transverse rollers connecting corresponding teeth at their apexes, an annular tire surrounding but spaced from the rim and having side-walls lapping the rim-edges, series of projections consisting of tooth-like members about the tire-walls with transverse bars connecting opposite members, said tire-projections exceeding in number those on the rim, studs secured at their opposite ends in the tire walls at said tire-projections, and sets of springs coiled about the studs presenting oppositely-extending spring-arms, with the arms of each set lapping those of adjacent sets and opposed to but disconnected from the rim-projections, for the purpose set forth.

WILLIAM H. FAHRNEY.

In presence of—
L. HEISLAR,
R. SCHAEFER.